United States Patent [19]

Skoch et al.

[11] 4,380,424
[45] Apr. 19, 1983

[54] PELLET DIE

[75] Inventors: Leroy V. Skoch, Glencoe; Keith E. Pike, Washington, both of Mo.

[73] Assignee: Ralston Purina Company, St. Louis, Mo.

[21] Appl. No.: 268,036

[22] Filed: May 28, 1981

[51] Int. Cl.³ ............................................ A01N 35/00
[52] U.S. Cl. ................................ 425/331; 425/382 R; 425/462; 425/DIG. 230
[58] Field of Search ............... 425/464, 462, 463, 331, 425/191, 382 R, 168, 508, DIG. 230

[56] References Cited

U.S. PATENT DOCUMENTS

| | | | |
|---|---|---|---|
| 2,059,486 | 11/1936 | Payne et al. | 425/331 |
| 2,759,219 | 8/1956 | Meakin | 425/190 |
| 2,902,715 | 9/1959 | Norman | 425/463 |
| 2,902,949 | 9/1959 | Meakin | 425/191 |
| 3,038,420 | 6/1962 | Immohr | 425/463 |
| 3,101,510 | 8/1963 | Packham | 425/331 |
| 3,129,458 | 4/1964 | Mitchell | 425/464 |
| 3,176,631 | 4/1965 | Cunningham | 425/461 |
| 3,199,465 | 8/1965 | Cunningham | 425/331 |
| 3,248,190 | 4/1966 | Woodward et al. | 425/464 |
| 3,391,657 | 7/1968 | Reese | 425/461 |
| 3,485,186 | 12/1969 | Vincent | 425/382 R |
| 3,516,120 | 6/1970 | Braun et al. | 425/382.2 |
| 3,559,238 | 2/1971 | Gilman | 425/168 |
| 3,890,454 | 6/1975 | Nijweide | 426/508 |
| 4,056,597 | 11/1977 | Cooper | 425/464 |
| 4,316,713 | 2/1982 | Trickett | 425/331 |

FOREIGN PATENT DOCUMENTS

| | | | |
|---|---|---|---|
| 205253 | 1/1957 | Australia | 425/331 |
| 1227606 | 10/1966 | Fed. Rep. of Germany | 425/464 |
| 101231 | 3/1968 | France | 425/464 |
| 58010 | of 1946 | Netherlands | 425/464 |
| 1522102 | 8/1978 | United Kingdom . | |

OTHER PUBLICATIONS

The Holmen Pelleting Symposium, Holmen Chemicals Ltd., Nov. 20, 1979.
Pelleting, Proceedings of the 1959 Feed Production School, Sep. 23-25, 1959.
Proceedings of the Eleventh Annual Feed Production School, Sep. 21-23, 1960.
Proceedings of the 1962 Feed Production School, Nov. 12-14, 1962.

Primary Examiner—Jay H. Woo
Attorney, Agent, or Firm—Virgil B. Hill

[57] ABSTRACT

An improved pellet mill die is disclosed which has improved production efficiency without a corresponding loss in pellet quality or durability. The die comprises a compression side, a discharge side, and a plurality of die holes extending through the die. The die holes have a countersink on the compression side, and preferably at least a portion of die holes have a relief section to thereby define a working section of the die hole where the pellet is formed, and an effective thickness for the die holes which is preferably less than the distance between the compression and discharge side of the die. The die has a ratio of effective thickness to countersink diameter of at least about 1.8 to 1 wherein the countersink diameter is at least about 137% and preferably between about 137-159% of the working section diameter.

33 Claims, 3 Drawing Figures

PELLET DIE

BACKGROUND OF THE INVENTION

The present invention relates to an improved die and particularly to an improved die to be used on a pellet mill for the pelleting of materials.

Pellet mills to which the present invention relates generally operate by feeding the material to be pelleted to a compression side of the die, over which an extrusion means, usually several extrusion rollers, operate to force the material through die holes and through a discharge side of the die. The continuous stream of material from the die holes is then subdivided to form individual pellets. One type of pellet mill on which such a die is used consists of a vertical revolving die in which the material to be pelleted is fed to the inside of a vertically supported rotating ring die. Fixed rollers are located on the inside of the rotating die which force the material through the die holes in the ring as it rotates. The material is extruded from the outer face of the die and subdivided by stationary knives. A second type of pellet mill is one in which the extrusion rollers are movable and they revolve on the inside of a stationary die which is located in a horizontal plane. They force the material through the die and into contact with cutoff knives that revolve on the outside of the die to subdivide the material.

In either of the above types of pellet mills, or other types in general, it has been recognized that die construction is a critical factor in obtaining desirable pellets as well as high production rates. For example, the thickness of the die, the number of holes in the die, and the surface finish of the die have all been found to affect pellet quality. The effect of some of these factors on pellet quality are generally discussed in the *Proceedings of the 1959 Feed Production School* on "Pelleting And Related Subjects", published by the Midwest Feed Manufacturers Association, Kansas City, Mo. One factor which is discussed on page 85 of this publication is the need for countersink on the compression side of the die which assists the flow of material into the die hole thereby improving production rate of the die.

The holes on pellet dies of the above types will vary in length depending on the thickness of the die. The die holes will also usually be "straight" or relieved in some fashion. A relieved die hole has been counterbored on the discharge side to provide a slightly larger diameter relief section, thereby reducing the working thickness of the die or the length of the section in which the pellet is formed. The relief section provides flexibility in selecting dies which are thicker, thereby improving die durability, yet enabling one to obtain the desired thickness for the die hole that actually forms the pellet. The difference in distance between the compression and discharge side of the die or overall thickness of the die and the distance of the relief section is referred to as the effective thickness of the die which in turn defines the thickness or length of the working section of the die in which the pellet is formed. The dimensions of the pellet are defined by the length and width of the working section.

There have also been a variety of dies proposed in which the relief section has been modified. For example, a variable relief die or staggered relief die are generally described in U.S. Pat. No. 3,129,458, and a tapered relief die in U.S. Pat. No. 3,391,657. A uniform relief die is often used and with this type of die all of the die holes have the same degree of relief thereby providing uniform relief along the face of the die with a uniform effective thickness for the die holes. While pellet mill die design has been extensively studied, a critical need still exists for a pellet die that is capable of a high production efficiency, including maximum rates of production and energy efficiency yet produces pellets of excellent quality. Usually, one has to make a compromise between rate of production and pellet quality in choosing the die most suited for use with the widest range of materials or formulas which are to be pelleted.

SUMMARY OF THE INVENTION

The present invention discloses a pellet mill die of a unique design which has significant advantages over pellet dies of the prior art. The pellet die of the present invention is capable of a very high rate of production with excellent efficiency yet produces pellets of excellent quality and durability. The achievement of these two factors is believed to be a significant improvement in the art since these two factors usually have an inverse relationship. The pellet die of the present invention has achieved this by designation of a critical relationship between the countersink of the die holes and the effective thickness thereof. While the advantages of having countersink over no countersink for the die holes has been recognized, nowhere has a recognition existed of a critical relationship between the countersink diameter and the effective thickness of the die hole. When this relationship is controlled within specific parameters, a die design is obtained which has an improved rate of production and improved efficiency without a significant decrease in pellet quality. Accordingly, the pellet mill die of the present invention comprises a die having a compression side and a discharge side with a plurality of die holes extending through said die. A substantial percentage of the die holes have a countersink on the compression side with a ratio of effective thickness to countersink diameter of at least about 1.8 to 1, preferably at least about 2.3 to 1 and most preferably 2.3–4.1 to 1, wherein the countersink diameter is at least about 137% and preferably between about 137–159% of the width or diameter of the working section of the die holes.

It is, therefore, an object of the present invention to provide an improved pellet mill die.

It is also an object to provide an improved pellet mill die which has a high rate of production and efficiency yet produces pellets of good durability for most materials.

It is also an object to provide an improved pellet mill die which produces pellets of good durability and quality for most types of materials.

It is also an object to provide an improved pellet mill die which produces pellets of good quality and durability for most conventional animal feed formulas under most types of processing conditions.

These and other objects will be apparent from the following description of a preferred embodiment of the present invention, taken in conjunction with the attached drawing.

DESCRIPTION OF THE PREFERRED EMBODIMENTS

Figure 1:
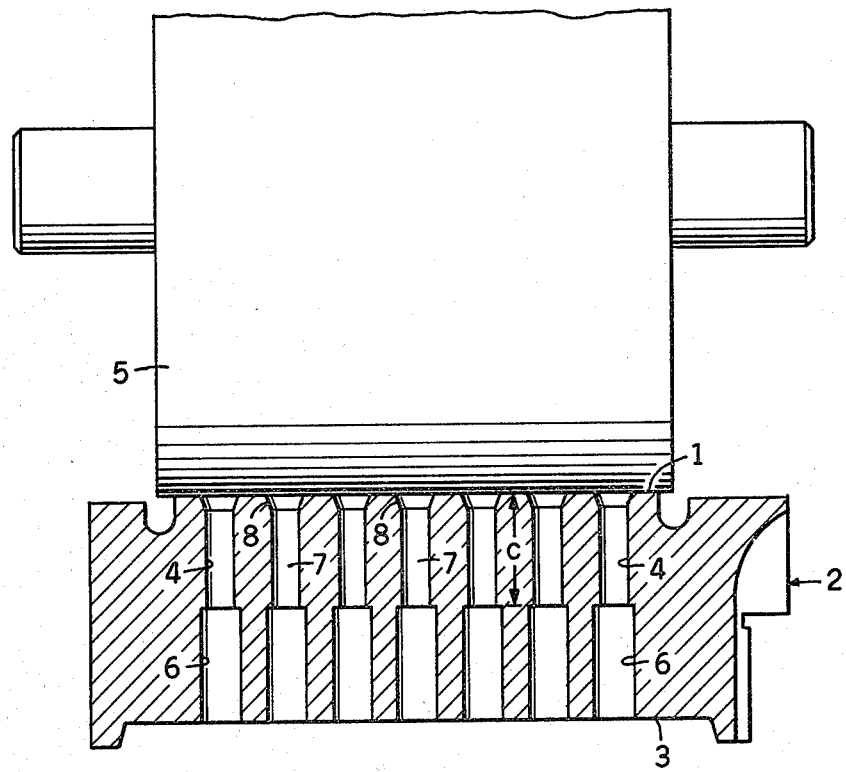
FIG. 1 shows a cross sectional view of the pellet die of the present invention together with a cross sectional view of an extrusion roller which cooperates to extrude material to be pelleted through the die.

With reference to FIG. 1, one type of pellet die 2 is shown which is usually circular or ring shaped. The die has a compression side 1 and a discharge side 3. The die has at least one die hole and usually a plurality of holes 4, arranged over the face of the die. The plurality of die holes extend through the die from the compression side 1 to the discharge side 3. Cooperatively with the pellet die 2, a roller or rollers 5 operate to force material which is fed onto the interior or compression surface 1 of the die 2 through the die holes 4 and out the discharge side of the die 3. As previously noted, the rollers 5 may be movable and operate over the compression side 1 of the die which is stationary or alternatively the rollers 5 may be fixed and the die 2 may rotate to accomplish the same result. In any event, the pellet die of the present invention is not limited by the specific type of pelleting apparatus with which it is used although the drawing illustrates a view of a portion of a typical pelleting apparatus which operates generally as described above. The material which is forced through the die exits the discharge side as a continuous stream of material and can be subdivided by contact of the stream with a rotating or fixed knife as the case may be.

In accordance with a specific but non-limiting embodiment of the present invention and as illustrated in FIG. 1, a pellet die 2 with uniform relief is shown. The die hole consists of two sections, a relief section 6 and a working section 7. The relief section 6 is produced by counterboring the die holes at their discharge side. The relief section 6 of the die hole improves flow of the material through the die. The working section 7 forms the material into the desired shape and the length of working section 7 is usually referred to as the effective thickness of the die. The length and width of the working section define the same dimensions of the pellets. The effective thickness of die 2 is, therefore, equal to the overall thickness or length of the die hole 4 between the compression and discharge side less the thickness or length of the relief section 6. A die hole which has no relief section has an effective thickness or a working section length that is equal to the overall length or thickness of the die. Although the present invention is described with reference to die holes having relief sections and therefore a die face with various relief patterns, it should be apparent that the relationship developed in the present invention between countersink and effective thickness will apply to dies which have no relief section as well.

While the attached drawing shows a die having uniform relief sections, other dies having different types of relief sections are well known in the art and the present invention is not intended to be limited by the relief pattern of the die holes. For example, a variable relief pattern for the die holes is also known in which a predetermined number of the rows of holes on the outermost side of the die are relieved by a ¼ of an inch or so thereby reducing the effective thickness of only these holes. A staggered relief die is also known in which a predetermined number of holes are relieved in "stepwise" fashion across the die face. Usually the center third of the die face would be the full effective thickness, one sixth of the die holes to each side of the center third of the die face would be relieved ¼" and the remaining one sixth on each side of those relieved ¼", or the outermost portions of the die face would be relieved more or usually ½". A third type of relief section is the tapered relief die, which usually has a relief section which is tapered towards the compression side of the die.

Figure 2:
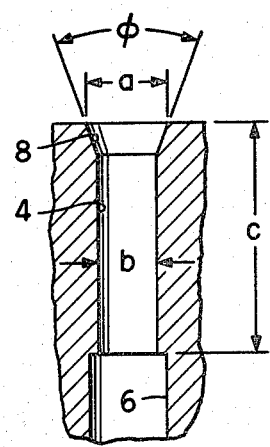
FIG. 2 shows an enlarged view of the countersink of a die hole of the pellet die to illustrate how the countersink and working section diameter are measured.
Figure 3:
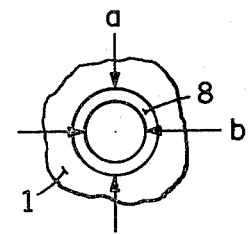
FIG. 3 shows a top view of a die hole of the pellet die of the present invention.

With reference to FIG. 1, the countersink 8 is illustrated and consists of a "funnel shaped" depression on the compression side of the die. With reference to FIG. 2, a side view of the die hole 4 from the compression side 1 of the die is shown to give a perspective view of the countersink. FIG. 3 shows a top view of the same die hole. The distance "a" set forth in FIG. 2 or FIG. 3 represents the diameter of the countersink for purposes of the present invention. The distance "b" illustrated in FIG. 2 or FIG. 3 represents the width of the working section of the die hole itself which in turn will define the diameter of the pellet produced on the die hole. The taper or angle of countersink 8 which is shown generally in FIG. 1 and more specifically in FIG. 2 as angle $\phi$, is not a critical factor in the present invention and is typically about 30°–40° which is commonly used for the countersink on most pellet dies.

The pellet die of the present invention has a critical relationship between the countersink diameter, illustrated in FIGS. 2 and 3 as distance "a", the effective thickness 7 of the die hole illustrated in FIG. 1 and FIG. 2 as distance "c" and the width of the working section, identified as distance "b" in FIGS. 2 and 3. It is these factors which have been determined to be the most critical factors in pellet die design insofar as achievement of a high rate of production and production efficiency together with consistently good pellet durability or quality for most types of materials.

This relationship comprises a ratio of effective thickness to countersink diameter for the die which is at least about 1.8 to 1, usually at least about 2.3 to 1 and preferably between about 2.3–4.1 to 1, and most preferably between about 3.1–3.6 to 1. The countersink diameter further comprises at least about 137% and preferably between about 137–159% of the working section width or diameter, and most preferably between about 142–148% of the working section diameter.

Specific reference to FIGS. 1 and 2 will illustrate the computation of these numerical limitations. The ratio of effective thickness to countersink diameter comprises the ratio of distance "c" in FIG. 1 to distance "a" in FIG. 2 or "c"/"a". The countersink diameter "a" is a percentage of the working section diameter "b" as shown by FIG. 2 or "a"/"b"×100%. The above computations are, of course, illustrated for a die having uniform relief in which all the die holes have the same effective thickness. When the die has a variable or staggered relief pattern, then the effective thickness of the die is calculated on a "weighted average" basis. For example, in the case of a staggered relief die, three different effective thicknesses usually exist across the face. Usually one-third of the die holes are of a predetermined effective thickness, one-third are ¼" less in effective thickness, and the remaining one-third are ½" less in effective thickness. Therefore, relief usually occurs in step wise fashion across the die face with the longest relief being on the outermost holes of the die face. The effective thickness of each one-third of the die face is separately calculated and these are added together to come up with the effective thickness on a "weighted average" basis for the overall die. This results in an average effective thickness that is less than the overall thickness of the die. For example, if ⅓ of the die holes have an effective thickness of 0.750", ⅓ has an effective thickness of 0.813" and ⅓ has an effective thickness of 0.875" then the overall effective thickness of the die consists of ⅓×0.750+⅓×0.813+⅓×0.875=0.250+0.271+0.292-=0.813 which represents the effective thickness of the die on a weighted average basis. The effective thickness for a variable relief die is calculated on a comparable basis. The effective thickness on a "weighted average" basis is used for calculating the ratio of effective thickness to countersink diameter required for a die made according to the present invention but with a die pattern that is not uniformly relieved.

Although the exact numerical value for the countersink diameter or the effective thickness will depend on the number of die holes desired on the die face, typically one would attempt to have the maximum number of die holes on the die face that is possible for purposes of maximum rates of production but the choice in term of the number of die holes is within the skill of the operator and this depends on the size of the pellet required, the die and so forth. Furthermore, insofar as the dies having a plurality of holes, it is preferred that a substantial percentage of the holes meet the limits set forth in the present invention for optimum performance of the dies although this is not intended to be a limiting factor in the present invention. Typically, this will mean that at least about 50% of the holes of the die meet the required specifications for countersink and preferably at least about 80% of the holes meet the required specifications for countersink. A typical ringed type pellet die used on a 100 h.p. pellet mill which is preferred for purposes of the present invention has a ring inside diameter of 16 in., a die face width of 4.5 in., an effective thickness of 0.75 in., and a countersink diameter of 0.245 in., to provide a ratio of effective thickness to countersink diameter of about 3.1 to 1. Such a die will also vary according to the size of pellets desired but assuming a pellet size of 11/64", then the countersink diameter will also comprise 142% of the working section diameter.

The use of the improved pellet die of the present invention in the pelleting of animal feeds produces pellets of excellent quality, with good durability during handling and with a minimal percentage of fines.

Good pellet quality also corresponds with a significant increase in production efficiency, two factors which are usually considered to have an inverse relationship.

The preferred pellet dies of the present invention at least for the production of animal feeds, also involves a specific set of process conditions which are different than are employed with a conventional die which usually have a much larger effective thickness and with no control of countersink diameter. In a conventional pelleting process, the ground feed mixture or "mash" is steam conditioned and fed to the pellet mill for pelleting. The gelatinization of starch bearing materials in the feed mixture by the presence of heat and moisture provide the binding for the particulate mixture. Typical moisture and temperature conditions for steam conditioning of the mash are 16–17% moisture and a temperature of 160°–180° F. The moisture level includes the inherent moisture of the feed ingredients.

The pelleting of animal feeds with the preferred pellet dies of the present invention employs higher moisture levels and higher temperatures than those mentioned above for conventional dies. Typical moisture levels for conditioning of the feed or mash in the pelleting of animal feeds with the dies of the present invention are between about 17 to 21% by weight. Typical temperatures employed for conditioning of the mash are usually about 200° F. or above and most typically about 200°–220° F.

The use of the above process conditions with the pellet die of the present invention for the pelleting of animal feeds yield a significant improvement in pellet quality and production efficiency. The higher temperatures and moisture levels, while requiring higher levels of steam are more than offset by the reduction in power consumption by the pellet mill itself.

The improved pelleting results achieved with the die of the present invention will be apparent from examination of the following examples.

EXAMPLE 1

To evaluate the effectiveness of the pellet die of the present invention, a cattle ration having the following formula was pelleted.

| Ingredient | % by Weight |
|---|---|
| Ground Corn | 72.8 |
| Dehulled Soybean Meal | 21.1 |
| Calcium Carbonate | 1.5 |
| Dicalcium Phosphate | 2.6 |
| Salt | 1.0 |
| Vitamins & Minerals | 1.0 |

The above mixture was pelleted in a California Pellet Mill Model 2S, manufactured by California Pellet Mill, San Francisco, Calif. with a vertically mounted rotating die having dimensions of 16" inside diameter and a die face width of 4.5" operating at a die speed of 171 r.p.m. equipped with a 100 h.p. motor.

Two different types of pellet conditioners were used, one being a DM conditioner manufactured by California Pellet Mill Co., San Francisco, Calif., capable of adding steam for conditioning of the feed, the second being a Zarow conditioner as described in U.S. Pat. No. 3,573,924 manufactured by Auto Pelleting, Feed Pelleting, Inc., Mt. Pulaski, Ill., capable of using dry heat and steam for conditioning. The conditioners that were used for each run are identified in Table I.

Six separate batches of the above feed mixture were pelleted on the above equipment with three different types of dies in two separate runs, the dies being described below.

Die #1—11/64 inch working section and therefore, pellet diameter, 2 inch total thickness, relief section of 1¼ inches. Uniform Relief. Effective Thickness—¾", Countersink=0.230" Ratio=3.3 to 1; Countersink=133% of working section diameter. 3420 die holes.

Die #2—11/64 inch working section and therefore, pellet diameter, 1¾ inch total thickness, relief section 1". Uniform Relief. Effectiveness Thickness—¾", Countersink 0.245" Ratio—3.1 to 1; Countersink=142% of working section diameter. 3240 die holes.

Die #3—11/64 inch working section and therefore, pellet diameter, 2 inch total thickness, 6 rows with relief sections of ½" and 12 rows with relief sections of ¼ inch.

Variable Relief. Effective Thickness "Weighted Average"=1.67", Countersink=0.230" Ratio—7.3 to 1; Countersink=133% of working section diameter. 3670 die holes.

Measurement was made of the production rate with each of the above dies, as well as motor power consumption by an ammeter connected directly to the pellet die motor. The pellets produced on each of the above dies were evaluated for quality by the "Kansas State Durability Test" as set forth in *Feed Manufacturing Technology*, page 527 (1976), published by the American Feed Manufacturer's Association. The value from this test represents the percentage of material retained on a No. 6 Tyler Screen.

The results from the above runs and pellet quality examination are set forth in Table I.

TABLE I

| Die # | Ratio Eff. Thickness to Countersink Diameter | Countersink - % of Working Section Diam. | Prod. Rate (Ton/Hr) | Type of Pellet Cond. | Cond. Meal Temp. (°F.) | Cond. Meal Moisture (% H$_2$O) | Ammeter Reading (Amps) | Power Consumption/Ton Kwh/Ton | Bushel Weight (lb/Bu) | Durability Test (%) |
|---|---|---|---|---|---|---|---|---|---|---|
| 1 | 3.3/1 | 133 | 5.2 | DM | 204 | 18.4 | 50 | 7 | 43.3 | 91.0 |
|   |   |   | 5.0 | Zarow | 211 | 17.6 | 50 | 7 | 44.0 | 91.5 |
| 2 | 3.1/1 | 142 | 5.0 | DM | 208 | 18.2 | 50 | 7 | 43.0 | 95.4 |
|   |   |   | 5.2 | Zarow | 210 | 18.3 | 50 | 7 | 44.0 | 94.2 |
| 3 | 7.3/1 | 134 | 5.1 | DM | 173 | 16.6 | 55 | 8 | 47.0 | 93.6 |
|   |   |   | 5.4 | Zarow | 180 | 17.1 | 58 | 8 | — | 91.1 |

With Die #2, made according to the present invention, production rate was also increased to 9 tons/hr. Processing conditions included a conditioned meal temp. of 210° F., an ammeter reading of 52, Power Consumption/ton of 4 Kwh/ton, and a Durability Test Value of 94.5%.

It may be seen from the data in Table I that the best results insofar as power consumption and pellet quality was achieved with the die of the present invention (#2), even at the higher production rate of 9 tons/hr as set forth above.

EXAMPLE 2

To further evaluate the effectiveness of these pellet dies of the present invention to the prior art, the following dairy ration having the following formula was pelleted.

| Ingredient | % by Weight |
|---|---|
| Ground Corn | 33.4 |
| Rice Hulls | 3.9 |
| Soybean Hulls | 20.0 |
| Wheat Middlings | 20.0 |
| Soybean Meal | 11.3 |
| Calcium Carbonate | 1.5 |
| Calcium Lignosulfonate | 1.6 |
| Dicalcium Phosphate | 1.1 |
| Salt | 0.5 |
| Urea | 1.6 |
| Molasses | 4.5 |
| Vitamins & Minerals | 0.6 |

The above mixture was pelleted on a California Pellet Mill Model 2S manufactured by California Pellet Mill, San Francisco, Calif. with a vertically mounted rotating die with dimensions of 16" inside diameter and a die face width of 4.5 operating at a die speed of 171 r.p.m. equipped with a 1800 r.p.m. 100 h.p. motor. A DM pellet conditioner manufactured by California Pellet Mill, San Francisco, Calif. capable of adding steam was used for conditioning of the feed mixture.

The dies described below were used to pellet the above feed mixture and the processing variables, including an examination of pellet quality are set forth in Table 2 below.

Die #4—11/16" working section and therefore pellet diameter, 2 inch total thickness, 6 rows with relief sections of ½" and 12 rows with relief sections of ¼". Variable relief die. Effective thickness "Weighted Average"=1.67. Countersink=0.230 inch. Ratio=7.3 to 1, Countersink=133% of working section diameter. 3670 die holes.

Die #5—11/64" working section and therefore pellet diameter, 1¾ inch total thickness, relief section of 1", Uniform Relief. Effective Thickness of ¾", Countersink=0.245". Ratio=3.1 to 1, Countersink=142% of working section diameter. 3240 die holes.

Die #6—11/64" pellet size, 1¾ inch total thickness, relief section of ¾", Uniform Relief. Effective Thickness of 1", Countersink=0.230. Ratio=4.4 to 1, Countersink=133% of working section diameter. 3240 die holes.

Die #7—11/64" pellet size, 1¾ inch total thickness, relief section of ¼", Uniform Relief. Effective Thickness=1½", Countersink=0.230", Ratio=6.5 to 1, Countersink=133% of working section diameter. 3240 die holes.

Die #8—11/64" pellet size, 2 inch total thickness, relief section of 1¼", Uniform Relief. Effective Thickness=¾", Countersink=0.230", Ratio=3.3 to 1, Countersink=133% of working section diameter. 3240 die holes.

TABLE 2

| Die # | Ratio Eff. Thickness to Countersink Diameter | Countersink - % of working section diam. | Prod. Rate (Ton/Hr) | Pellet Die Speed (r.p.m.) | Cond. Meal Temp. (°F.) | Cond. Meal Moisture (% H$_2$O) | Ammeter Reading (Amps) | Power Consumption/Ton Kwh/Ton | Bushel Weight (lb/Bu) | Durability Test (%) |
|---|---|---|---|---|---|---|---|---|---|---|
| 4 | 7.3 to 1 | 133 | 5.4 | 171 | 150 | 15.3 | 70 | 10 | 41.0 | 93.2 |
| 5 | 3.1 to 1 | 142 | 4.9 | 171 | 213 | 17.7 | 55 | 8 | 38.5 | 95.3 |
| 6 | 4.4 to 1 | 133 | 3.3 | 171 | 185 | 16.9 | 40 | 9 | 39.1 | 94.6 |
| 7 | 6.5 to 1 | 133 | 5.3 | 171 | 155 | 16.2 | 60 | 8 | 40.0 | 93.0 |
| 8 | 3.3 to 1 | 133 | 3.2 | 317 | 214 | 18.4 | 50 | 12 | 37.0 | 94.2 |

At comparable production rates, the best results in terms of both pellet quality and power consumption per ton was obtained with die No. 5 made according to the present invention.

EXAMPLE 3

To evaluate the effectiveness of the pellet die of the present invention a ration having the formula set forth below was pelleted.

| Ingredient | % by Weight |
|---|---|
| Ground Corn | 36.0 |
| Dehydrated Alfalfa | 0.5 |
| Rice Hulls | 2.9 |
| Wheat Middlings | 51.1 |
| Calcium Carbonate | 2.0 |
| Salt | 0.5 |
| Urea | 1.4 |
| Molasses | 5.5 |
| Vitamins & Minerals | 0.1 |

The above mixture was pelleted on the equipment described in Example 1 and the die was operated at two separate speeds of 317 r.p.m. and 171 r.p.m.

The dies described below were used to pellet the above feed mixture and the processing variables including the number of runs made with these dies are set forth in Table 3.

Die #9—11/64" working section and therefore pellet diameter, 2¼ inch total thickness, 6 rows of die holes with relief sections of ½" and 12 rows of die holes with relief sections of ¼". Variable Relief Die. Effective Thickness "Weighted Average"=1.92. Countersink=0.230". Ratio=8.3 to 1, Countersink=133% of working section diameter. 3870 die holes.

Die #10—11/64" working section and therefore pellet diameter, 1¾" total thickness, relief sections of 1", Uniform Relief. Effective Thickness=¾", Countersink=0.245". Ratio=3.1 to 1, Countersink=142% of working section diameter. 3240 die holes.

Die #11—11/64" working section and therefore pellet diameter, 1¾" total thickness, relief sections of ⅞", Uniform Relief. Effective Thickness=⅞", Countersink=0.245. Ratio=3.6 to 1, Countersink=142% of working section diameter. 3240 die holes.

Die #12—11/64" working section and therefore pellet diameter, 1¾" total thickness, 6 rows with ¾" relief sections, 6 rows with 13/16" relief section and 6 rows with ⅞" relief sections—Staggered Relief Die. Effective Thickness "Weighted Average"=0.813". Countersink=0.245". Ratio=3.3 to 1, Countersink=142% of working section diameter. 3240 die holes.

Die #13—11/64" pellet size, 1¾ inch total thickness, ¾" relief section, Uniform Relief. Effective Thickness=1", Countersink=0.245". Ratio=4.1 to 1, Countersink=142% of working section diameter. 3240 die holes.

Die #14—11/64" pellet size, 1¾" total thickness, 1" relief sections, Uniform Relief, Effective Thickness=0.750, Countersink=0.255 Ratio=2.9 to 1, Countersink=148% of working section diameter. 3240 die holes.

Measurements were made of the process parameters described in Table 3 as well as pellet quality by the technique referenced in Example 1.

TABLE 3

| Die # | Ratio Eff. Thickness to Countersink Diameter | Countersink - % of working section diam. | Prod. Rate (Ton/Hr) | Die Speed (r.p.m.) | Cond. Meal Temp. (°F.) | Cond. Meal Moisture (% H₂O) | Ammeter Reading (Amps) | Power Consumption/Ton Kwh/Ton | Bushel Weight (lb/Bu) | Durability Test (%)* | 8 balls** |
|---|---|---|---|---|---|---|---|---|---|---|---|
| 9 | 8.7 to 1 | 133 | 4.6 | 317 | 137 | 16.7 | 85 | 13.6 | 46.7 | 96.3 | 86.4 |
| | | | 5.3 | 317 | 137 | 16.5 | 95 | 13.2 | 44.3 | 96.9 | 88.8 |
| | | | 4.3 | 171 | 138 | 17.0 | 80 | 13.7 | 46.7 | 96.9 | 87.5 |
| 10 | 3.1 to 1 | 142 | 5.0 | 317 | 217 | 19.7 | 50 | 7.4 | 31.3 | 94.4 | 86.9 |
| | | | 5.7 | 317 | 217 | 19.7 | 50 | 6.4 | 37.5 | 94.2 | 91.9 |
| | | | 6.5 | 171 | 216 | 20.0 | 50 | 5.7 | 38.0 | 96.0 | 91.7 |
| 11 | 3.6 to 1 | 142 | 5.1 | 317 | 216 | 19.8 | 55 | 7.9 | 37.0 | 95.4 | 91.8 |
| | | | 5.9 | 317 | 216 | 19.8 | 60 | 7.5 | 37.0 | 95.6 | 89.4 |
| | | | 6.2 | 317 | 212 | 19.5 | 65 | 7.7 | 37.0 | 94.8 | 92.0 |
| | | | 4.8 | 171 | 214 | 19.8 | 55 | 8.4 | 37.3 | 94.9 | 94.0 |
| 12 | 3.3 to 1 | 142 | 5.0 | 317 | 216 | 19.1 | 60 | 8.8 | 37.3 | 95.3 | 91.4 |
| | | | 6.6 | 317 | 217 | 20.0 | 60 | 6.7 | 37.0 | 96.0 | 92.0 |
| | | | 8.0 | 317 | 216 | 19.8 | 75 | 6.9 | 36.7 | 94.6 | 91.9 |
| | | | 4.1 | 171 | 215 | 20.3 | 50 | 9.0 | 36.7 | 95.3 | 93.1 |
| 13 | 4.1 to 1 | 142 | 4.9 | 317 | 216 | 19.7 | 60 | 9.0 | 37.2 | 95.8 | 92.0 |
| | | | 6.4 | 317 | 216 | 19.8 | 60 | 6.9 | 37.0 | 94.0 | 89.7 |
| | | | 4.1 | 171 | 215 | 19.9 | 55 | 9.0 | 36.2 | 95.6 | 93.3 |
| 14 | 2.9 to 1 | 148 | 4.8 | 317 | 215 | 20.0 | 55 | 8.4 | 37.5 | 94.8 | 90.6 |
| | | | 6.1 | 317 | 215 | 20.3 | 60 | 7.2 | 36.8 | 94.6 | 89.9 |
| | | | 9.0 | 317 | 214 | 20.6 | 80 | 6.5 | 36.7 | 95.2 | 91.2 |
| | | | 4.0 | 171 | 216 | 20.7 | 50 | 9.2 | 37.0 | 95.4 | 92.1 |

*Test generally as described in Feed Manufacturing Technology, p. 527.
**Test as generally described above except 250g feed samples used and 8¾" diameter steel balls were added to sample and tumbled for 3 minutes to provide a more severe durability test.

It is apparent from an examination of the information contained in Table 3, that a die (#9) having a countersink diameter which is only 133% of the working section diameter has a power consumption that is at least 1–1.5 times as great as the dies of the present invention (#10–14). Furthermore, the pellet durability was clearly better with the dies of the present invention when the more rigorous durability test was applied to the pellets by the addition of 8 balls to the pellet sample in the tumbler.

EXAMPLE 4

The following feed formula was pelleted on the equipment and with the dies set forth below

| Ingredient | % by Weight |
|---|---|
| Ground Corn | 59.3 |
| Soybean Meal | 29.8 |
| Calcium Carbonate | 1.4 |

-continued

| Ingredient | % by Weight |
|---|---|
| Dicalcium Phosphate | 1.4 |
| Salt | 1.0 |
| Animal Fat | 0.5 |
| Molasses | 4.0 |
| Pellet Binder | 2.0 |
| Vitamins & Minerals | 0.6 |

The above mixture was pelleted on a Century Dual Speed 100 h.p. pellet mill manufactured by California Pellet Mill, San Francisco, Calif., with vertically mounted rotating dies having dimensions of 16" inside diameter and a die face width of 4.5", at a die speed of 317 and 171 r.p.m. equipped with a DM conditioner manufactured by California Pellet Mill Co., San Francisco, Calif., capable of adding steam for conditioning of the feed mixture.

The dies described below were used to pellet the above mixture and the processing variables including an examination of pellet quality are set forth in Table 4 below.

Die #15—11/64" working section and therefore pellet diameter, 2¼" total thickness, relief 6 rows of die holes with sections of ⅜" and 12 rows of die holes with relief sections of ¼". Variable relief die. Effective Thickness "Weighted Average"=1.92". Countersink=0.230". Ratio=8.3 to 1, Countersink=133% of working section diameter. 3870 die holes.

Die #16—11/64" working section and therefore pellet diameter, 1¾" total thickness, 1" relief sections—Uniform Relief. Effective Thickness=¾", Countersink=0.245". Ratio=3.1 to 1, Countersink=142% of working section diameter. 3240 die holes.

Die #17—11/64" working section and therefore pellet diameter, 1¾" total thickness, 6 rows with ¾" relief sections, 6 rows with 13/16" relief sections and 6 rows with ⅞" relief sections—Staggered Relief Die. Effective Thickness "Weighted Average"=0.813". Countersink=0.245". Ratio=3.3 to 1, Countersink=142% of working section diameter. 3240 die holes.

It may be seen that the best results insofar as power consumption per ton and pellet quality at comparable production rates was with the dies of the present invention (#16, #17).

EXAMPLE 5

The formula generally described in Example 4 was pelleted on a California Pellet Mill Model 2S, manufactured by California Pellet Mill, San Francisco, Calif., with vertically mounted rotating dies having dimensions of 16" inside diameter and a die face width of 4.5", operated at a die speed of 171 r.p.m., equipped with a 1800 r.p.m. 100 h.p. motor. The mill was equipped with a DM conditioner manufactured by California Pellet Mill, San Francisco, Calif., capable of adding steam to the mixture prior to pelleting.

The dies described below were used to pellet the above feed mixture and the processing variables including the number of runs made with these dies are set forth in Table 5.

Die #18—11/64" working section and therefore pellet diameter, 2¼" total thickness, 6 rows of die holes with ⅜" relief sections and 12 rows of die holes with relief sections of ¼". Variable Relief Die. Effective Thickness "Weighted Average"=1.92. Countersink=0.230", Countersink=133% of working section diameter, Ratio=8.3 to 1. 3870 die holes.

Die #19—11/64" pellet size, 1¾" total thickness, 1" relief section, Uniform Relief, Effective Thickness=¾", Countersink=0.245", Countersink=142% of working section diameter. Ratio=3.1 to 1. 3240 die holes.

Die #20—11/64" pellet size, 1¾" total thickness, ⅞" relief section—Uniform Relief. Effective Thickness=⅞", Countersink=0.245", Countersink=142% of working section diameter, Ratio=3.6 to 1. 3240 die holes.

Die #21—11/64" working section and therefore pellet diameter, 1¾" total thickness, 6 rows with ¾" relief sections, 6 rows with 13/16" relief sectionk and 6 rows with ⅞" relief sections—Staggered Relief Die. Effective Thickness "Weighted Average"=0.813", Countersink=0.245", Countersink=142% of working section diameter, Ratio=3.3 to 1. 3240 die holes.

TABLE 4

| Die # | Ratio Eff. Thickness to Countersink Diameter | Countersink - % of working section diam. | Prod. Rate (Ton/Hr) | Die Speed (r.p.m.) | Cond. Meal Temp. (°F.) | Cond. Meal Moisture (% H₂O) | Ammeter Reading (Amps) | Power Consumption/Ton Kwh/Ton | Bushel Weight (lb/Bu) | Durability Test (%)* | ** |
|---|---|---|---|---|---|---|---|---|---|---|---|
| 15 | 8.3 to 1 | 133 | 4.4 | 317 | 160 | 17.7 | 64 | 11 | 46.7 | 96.0 | 84.1 |
| 16 | 3.1 to 1 | 142 | 4.8 | 317 | 214 | 19.3 | 63 | 10 | 42.0 | 97.6 | 96.8 |
| | | | 7.3 | 317 | 213 | — | 55 | 6 | 42.0 | 97.8 | 97.1 |
| | | | 4.6 | 171 | 213 | 18.9 | 38 | 6 | 42.0 | 97.1 | 95.0 |
| 17 | 3.3 to 1 | 142 | 12.8 | 317 | 214 | 19.8 | 55 | 3 | 42.0 | 96.6 | 93.2 |

*Test as described in Feed Manufacturing Technology, p. 527.
**Test generally described above except 250g feed sample was used and 8¾" diameter steel balls were added to sample and tumbled for 3 minutes to provide a more severe test.

sink=0.245", Countersink=142% of working section diameter, Ratio=3.3 to 1. 3240 die holes.

TABLE 5

| Die # | Ratio Eff. Thickness to Countersink Diameter | Countersink - % of working section diam. | Production Rate (Ton/Hr) | Conditioned Meal Temp. (°F.) | Conditioned Meal Moisture (% H₂O) | Ammeter Reading (Amps) | Power Consumption/Ton Kwh/Ton | Bushel Weight (lb/Bu) | Durability Test (%)** |
|---|---|---|---|---|---|---|---|---|---|
| 18 | 8.3 to 1 | 133 | 4.1 | 135 | 16.6 | 55 | 9.9 | 47.7 | 94.0[1] 84.0[2] 76.3[3] |
| 19 | 3.1 to 1 | 142 | 5.4 | 213 | 19.7 | 45 | 6.1 | 43.2 | 96.3[1] 93.6[2] 89.6[3] |
| | | | 6.2 | 213 | 19.7 | 45 | 5.3 | 43 | 96.2[1] 95.0[2] |

TABLE 5-continued

| Die # | Ratio Eff. Thickness to Countersink Diameter | Countersink - % of working section diam. | Production Rate (Ton/Hr) | Conditioned Meal Temp. (°F.) | Conditioned Meal Moisture (% H$_2$O) | Ammeter Reading (Amps) | Power Consumption/Ton Kwh/Ton | Bushel Weight (lb/Bu) | Durability Test (%)** |
|---|---|---|---|---|---|---|---|---|---|
|  |  |  | 8.5 | 214 | 18.9 | 50 | 4.3 | 42 | 91.4[3]<br>95.1[1]<br>93.1[2] |
| 20 | 3.6 to 1 | 142 | 5.6 | 216 | 19.7 | 55 | 7.2 | 43.3 | 90.8[3]<br>95.7[1]<br>93.9[2] |
| 21 | 3.3 to 1 | 142 | 5.6 | 216 | 20.0 | 55 | 7.2 | 40.7 | 91.4[3]<br>95.5[1]<br>93.4[2] |
|  |  |  | 6.7 | 215 | 18.9 | 70 | 7.7 | 40.2 | 90.6[3]<br>95.8[1]<br>95.6[2]<br>92.8[3] |

[1] No balls - 10 min.
[2] 5 balls - 3 min.
[3] 8 balls - 3 min.
**Test as generally described in Feed Manufacturing Technology, p. 527, except varying amounts of ⅜" diameter steel balls was added to 250g sample of feed and tumbled for different times.

The data in Table 5 clearly indicates the best results in terms of energy savings and pellet quality was obtained with the dies of the present invention (#19, 20, and 21). Die #18, representing a conventional die, showed high energy consumption even at a lower production rate than was employed for the other dies. Furthermore, the better pellet durability obtained with the dies of the present invention is readily apparent from the results, especially when the most rigorous test conditions identified as Footnote 3 in Table 5 were employed.

EXAMPLE 6

The following feed formula was pelleted on the equipment and with the dies set forth below.

| Ingredient | % by Weight |
|---|---|
| Ground Corn | 67 |
| Soybean Meal | 23.3 |
| Calcium Carbonate | 1.6 |
| Dicalcium Phosphate | 1.4 |
| Salt | 1.0 |
| Animal Fat | 0.5 |
| Molasses | 4.0 |
| Vitamins and Minerals | 1.2 |

The above mixture was pelleted on a Century Dual Speed 100 h.p. pellet mill manufactured by California Pellet Mill, San Francisco, Calif., with vertically mounted rotating dies having dimensions of 16" inside diameter and a die face width of 4.5", at a die speed of 317 and 171 r.p.m. equipped with a DM conditioner manufactured by California Pellet Mill Co., San Francisco, Calif., capable of adding steam for conditioning of the feed mixture.

The dies described below were used to pellet the above mixture and the processing variables including an examination of pellet quality are set forth in Table 6 below.

Die #22—11/64" working section and therefore pellet diameter, 2¼" total thickness, relief 6 rows of die holes with sections of ½" and 12 rows of die holes with relief sections of ¼". Variable relief die. Effective thickness "Weighted Average"=1.92", Ratio=8.3 to 1, Countersink=133% of working section diameter. 3870 die holes.

Die #23—11/64" working section and therefore pellet diameter, 1¾" total thickness, 1" relief sections—Uniform Relief. Effective Thickness=¾", Countersink=0.245" Ratio=3.1 to 1, Countersink=142% of working section diameter. 3240 die holes.

Die #24—11/64" working section and therefore pellet diameter, 1¾" total thickness, 1⅛" relief sections—Uniform Relief. Effective Thickness=0.625", Countersink=0.245", Ratio=2.6 to 1, Countersink=142% of working section diameter. 3240 die holes.

Die #25—11/64" working section and therefore pellet diameter, 1¾" total thickness. 1⅛" relief sections—Uniform Relief. Effective Thickness=0.625", Countersink=0.255", Ratio=2.5 to 1, Countersink=148% of working section diameter. 3240 die holes.

TABLE 6

| Die # | Ratio Eff. Thickness to Countersink Diameter | Countersink - % of working section diam. | Prod. Rate (Ton/Hr) | Die Speed (r.p.m.) | Cond. Meal Temp. (°F.) | Cond. Meal Moisture (% H$_2$O) | Ammeter Reading (Amps) | Power Consumption/Ton Kwh/Ton | Bushel Weight (lb/Bu) | Durability Test (%)* | ** |
|---|---|---|---|---|---|---|---|---|---|---|---|
| 22 | 8.3 to 1 | 133 | 5.2 | 171 | 145 | 17.1 | 68 | 9.6 | 44 | 87.1 | 62.8 |
|  |  |  | 5.6 | 317 | 144 | 17.0 | 72 | 9.5 | 45 | 86.8 | 57.4 |
| 23 | 3.1 to 1 | 142 | 11.0 | 317 | 213 | 20.1 | 95 | 6.3 | 41.5 | 96.5 | 92.3 |
| 24 | 2.6 to 1 | 142 | 7.7 | 317 | 212 | 19.3 | 55 | 5.3 | 40.5 | 95.9 | 83.0 |
|  |  |  | 11.6 | 317 | 213 | 19.9 | 90 | 5.7 | 38.5 | 93.9 | 88.1 |
| 25 | 2.5 to 1 | 148 | 7.6 | 317 | 213 | 19.9 | 80 | 7.7 | 40.5 | 96.1 | 92.2 |
|  |  |  | 8.4 | 317 | 213 | 20.4 | 90 | 7.9 | 39.5 | 95.8 | 92.1 |

*Test as described in Feed Manufacturing Technology, p. 527.
**Test as generally described above except 350g feed sample was used and 8¼" diameter steel balls were added to sample and tumbled for 3 minutes to provide a more severe test.

The data in Table 6 clearly indicates that the best results in terms of energy savings and particularly pellet durability was obtained with the dies of the present invention (#23, 24, and 25).

The improved results obtained with the die of the present invention are readily apparent from a reading of the above specific Examples. It should be understood that the present invention is not intended to be limited by the specific description contained in these Examples and it is intended to include all reasonable modifications or equivalents to the die of the present invention within the scope thereof.

What is claimed is:

1. A pellet mill die comprising a compression side, a discharge side and at least one die hold extending through said die, having a countersink on the compression side, said die hole having a working section for pellet formation, said section having a diameter that defines pellet size and a length that defines the effective thickness for the die hole, said die hole having ratio of effective thickness to countersink diameter which is at least about 1.8 to 1 and a countersink diameter which is between about 137% to 159% of the working section diameter.

2. The pellet die of claim 1 wherein said die hole has a ratio of effective thickness to countersink diameter which is at least about 2.3 to 1.

3. The pellet die of claim 1 wherein said die hole has a ratio of effective thickness to countersink diameter which is between about 2.3–4.1 to 1.

4. The pellet die of claim 3 wherein said die hole has a ratio of effective thickness to countersink diameter which is between about 3.1–3.6 to 1.

5. The pellet die of claim 1 wherein said die hole has a countersink diameter which is between about 142–148% of the working section diameter.

6. The pellet die of claim 1 wherein said die has a plurality of holes.

7. A pellet mill die comprising a compression side, a discharge side and at least one die hole extending through said die, having a countersink on the compression side, said die hole having a relief section for pellet expansion and a working section for pellet formation, said working section having a diameter that defines pellet size and a length that defines the effective thickness for the die hole, said die hole having a ratio of effective thickness to countersink diameter which is between about 137% to 159% of the working section diameter.

8. The pellet die of claim 7 wherein said die hole has a ratio of effective thickness to countersink diameter, which is at least about 2.3 to 1.

9. The pellet dies of claim 7 wherein said die hole has a ratio of effective thickness to countersink diameter, which is between about 2.3–4.1 to 1.

10. The pellet die of claim 9 wherein said die hole has a ratio of effective thickness to countersink diameter which is between about 3.1–3.6 to 1.

11. The pellet die of claim 8 wherein said die hole has a countersink diameter which is between about 142–148% of the working section diameter.

12. The pellet die of claim 7 wherein said die has a plurality of holes.

13. A pellet mill die comprising a compression side, a discharge side and a plurality of die holes extending through said die having a countersink on the compression side, said holes having a relief section of uniform length and a working section of a diameter that defines pellet size having a uniform length which defines the effective thickness for the die, a substantial percentage of said die holes having a ratio of effective thickness to countersink diameter which is at least about 1.8 to 1 and a countersink diameter which is between about 137% to 159% of the working section diameter.

14. The pellet mill die of claim 13 wherein said die holes have a ratio of effective thickness to countersink diameter which is at least about 2.3 to 1.

15. The pellet die of claim 13 wherein said die holes have a ratio of effective thickness to countersink diameter which is between about 2.3–4.1 to 1.

16. The pellet mill die of claim 15 wherein said die holes have a ratio of effective thickness to countersink diameter which is between about 3.1–3.6 to 1.

17. The pellet mill die of claim 13 wherein said die holes have a countersink diameter which is between about 142–148% of the working section diameter.

18. The pellet mill die of claim 13 wherein the percentage of die holes comprises at least about 50%.

19. The pellet mill die of claim 13 wherein the percentage of die holes comprises at least about 80%.

20. A pellet mill die comprising a compression side, a discharge side and a plurality of die holes extending through said die, having a countersink on the compression side, a predetermined portion of said holes having a relief section of greater length and a working section of less length than the remaining holes thereby defining an average effective thickness for said die which is less than the overall thickness of the die, said working section having a diameter that defines pellet size, a substantial percentage of said die holes having a ratio of average effective thickness to countersink diameter which is at least about 1.8 to 1 and a countersink diameter which is between about 137% to 159% of the working section diameter.

21. The pellet mill die of claim 20 wherein said die holes have a ratio of average effective thickness to countersink diameter which is at least 2.3 to 1.

22. The pellet mill die of claim 20 wherein said die holes have a ratio of effective thickness of countersink diameter which is between about 2.3–4.1 to 1.

23. The pellet mill die of claim 22 wherein said die holes have a ratio of average effective thickness to countersink diameter which is between about 3.1–3.6 to 1.

24. The pellet mill die of claim 20 wherein said die holes have a countersink diameter which is between about 142–148% of the working section diameter.

25. The pellet mill die of claim 20 wherein the percentage of die holes comprises at least about 50%.

26. The pellet mill die of claim 20 wherein the percentage of die holes comprises at least about 80%.

27. A pellet mill die comprising a compression side, a discharge side and a plurality of die holes extending through said die, having a countersink on the compression side, a first predetermined portion of said holes having a relief section of greater length and a working section of less length than the remaining holes, a second predetermined portion of said holes having a relief section and working section of a length intermediate to said first portion and the remaining holes, thereby defining an average effective thickness for said die which is less than the overall thickness of the die, said working section having a diameter that defines pellet size, a substantial percentage of said die holes having a ratio of average effective thickness to countersink diameter which is at least about 1.8 to 1 and a countersink diameter which is between about 137% to 159% of the working section diameter.

28. The pellet mill die of claim 27 wherein said die holes have a ratio of average effective thickness to countersink diameter which is at least about 2.3 to 1.

29. The pellet mill die of claim 27 wherein said die holes have a ratio of average effective thickness to countersink diameter which is between about 2.3–4.1 to 1.

30. The pellet mill die of claim 29 wherein said die holes have a ratio of average effective thickness to countersink diameter which is between about 3.1–3.6 to 1.

31. The pellet mill die of claim 27 wherein said die holes have a countersink diameter which is between about 142–148% of the working section diameter.

32. The pellet mill die of claim 27 wherein the percentage of die holes comprises at least about 50%.

33. The pellet mill die of claim 27 wherein the percentage of die holes comprises at least about 80%.

* * * * *